US009751170B2

(12) United States Patent
Calzavara et al.

(10) Patent No.: US 9,751,170 B2
(45) Date of Patent: Sep. 5, 2017

(54) ELECTRIC SPINDLE FOR NUMERICAL CONTROL MACHINES

(71) Applicant: FCS SYSTEM S.r.l., Casale sul Sile (IT)

(72) Inventors: Andrea Calzavara, Silea (IT); Almerino Canuto, Casale sul Sile (IT)

(73) Assignee: FCS SYSTEM S.R.L., Casale sul Sile (IT)

( * ) Notice: Subject to any disclaimer, the term of this patent is extended or adjusted under 35 U.S.C. 154(b) by 177 days.

(21) Appl. No.: 14/394,722

(22) PCT Filed: Apr. 17, 2013

(86) PCT No.: PCT/IB2013/053052
§ 371 (c)(1),
(2) Date: Oct. 15, 2014

(87) PCT Pub. No.: WO2013/156951
PCT Pub. Date: Oct. 24, 2013

(65) Prior Publication Data
US 2015/0078854 A1    Mar. 19, 2015

(30) Foreign Application Priority Data

Apr. 17, 2012    (IT) .............................. TV2012A0063

(51) Int. Cl.
*B23B 31/26*        (2006.01)
*B23Q 1/70*         (2006.01)
(Continued)

(52) U.S. Cl.
CPC .................. *B23Q 1/70* (2013.01); *B23C 1/02* (2013.01); *B23Q 5/048* (2013.01); *B23Q 5/10* (2013.01);
(Continued)

(58) Field of Classification Search
CPC ........... Y10T 409/309352; Y10T 409/309408; Y10T 409/309464; B23Q 1/265;
(Continued)

(56) References Cited

U.S. PATENT DOCUMENTS 5,033,922 A * 7/1991 Watanabe ............. B23B 31/265
279/907
5,690,137 A * 11/1997 Yamada ............... B23Q 1/0036
137/240

(Continued)

FOREIGN PATENT DOCUMENTS

EP    1 088 618 A2    4/2001
EP    1 609 549 A1    12/2005
JP    2000271831 A  * 10/2000

OTHER PUBLICATIONS

International Search Report and written Opinion of ISA, PCT/IB2013/053052, published Jun. 19, 2013.

*Primary Examiner* — Daniel Howell
*Assistant Examiner* — Yasir Diab
(74) *Attorney, Agent, or Firm* — Matthew A. Pequignot; Pequignot + Myers LLC (57) ABSTRACT

Electric spindle for numerical control machines structured to lock and rotationally drive a tool about a predetermined reference axis locally coinciding with the longitudinal axis of the tool; the electric spindle comprising: an outer structural casing that is structured to be rigidly attachable to a generic numerical control machine; an electric motor that is housed within the structural casing and is provided with a drive shaft, which projects/emerges with its front end outside the structural casing while remaining locally coaxial to the reference axis of the electric spindle; a rotating thrust-bearing bushing or sleeve, which is fitted in an axially rotatable manner on the front end of the drive shaft via interposition of a first set of annular rolling bearings, and is (Continued)

maintained coaxial to the reference axis of the electric spindle by a second set of annular rolling bearings, which are interposed between the rotating bushing or sleeve and the structural casing; and at least one disassemblable toolholder head that is structured to be attachable, in a rigid and stable though easily releasable manner, to the front end of the drive shaft, is structured so as to accommodate and retain, in a rigid and stable though easily releasable manner, the shank of a generic tool for numerical control machines, and is provided with a peripheral crown that is dimensioned/structured to stably abut, selectively and alternatively, on the front end of the drive shaft or on the rotating thrust-bearing bushing or sleeve.

18 Claims, 4 Drawing Sheets

(51) Int. Cl.
| | | |
|---|---|---|
| *B23Q 5/04* | (2006.01) | |
| *B23C 1/02* | (2006.01) | |
| *B23Q 5/10* | (2006.01) | |
| *B23Q 3/12* | (2006.01) | |
| *B23Q 5/00* | (2006.01) | |

(52) U.S. Cl.
CPC ......... *B23B 31/263* (2013.01); *B23C 2260/08* (2013.01); *B23C 2270/022* (2013.01); *B23Q 3/12* (2013.01); *B23Q 2005/005* (2013.01); *Y10T 409/309352* (2015.01); *Y10T 409/309408* (2015.01); *Y10T 409/309464* (2015.01)

(58) Field of Classification Search
CPC ......... B23Q 3/12; B23B 31/26; B23B 31/261; B23B 31/263; B23B 31/265; B23B 31/4026; B23B 31/4033; B23B 31/406; B23B 31/4066
USPC .......................................................... 384/461
See application file for complete search history.

(56) References Cited

U.S. PATENT DOCUMENTS

| | | | | |
|---|---|---|---|---|
| 6,234,731 | B1* | 5/2001 | Sakamoto | B23B 31/261 |
| | | | | 409/144 |
| 6,238,152 | B1* | 5/2001 | Fujimoto | B23B 31/261 |
| | | | | 408/239 A |
| 6,644,900 | B1* | 11/2003 | Sugata | B23Q 1/70 |
| | | | | 408/57 |
| 6,860,683 | B2* | 3/2005 | Choi | B23B 31/261 |
| | | | | 409/136 |
| 2005/0232720 | A1* | 10/2005 | Lu | B23B 31/265 |
| | | | | 409/233 |
| 2005/0236169 | A1* | 10/2005 | Xiao | B23B 31/261 |
| | | | | 173/213 |
| 2006/0177168 | A1* | 8/2006 | Kitamura | F16C 19/55 |
| | | | | 384/517 |
| 2007/0154274 | A1* | 7/2007 | Petrescu | B23B 31/261 |
| | | | | 409/233 |

* cited by examiner

ELECTRIC SPINDLE FOR NUMERICAL CONTROL MACHINES

RELATED APPLICATION DATA

This application is the national stage entry of International Appl. No. PCT/IB2013/053052, filed Apr. 17, 2013, which claims priority to Italian Patent Application No. TV2012A000063, filed Apr. 17, 2012. All claims of priority to these applications are hereby made, and each of these applications is hereby incorporated in its entirety by reference.

TECHNICAL FIELD

The present invention relates to an electric spindle for numerical control machines.

More in detail, the present invention relates to an electric spindle for numerical control milling machines, an application to which the following description will make explicit reference, but without any loss of generality.

BACKGROUND ART

As is known, the electric spindles of numerical control machines are composed of a tool-holder spindle and an electric motor that are housed inside a same outer structural casing, aligned one after the other along the longitudinal axis of the electric spindle, and are mechanically coupled to each other so that the electric motor can drive the tool-holder spindle in rotation about the longitudinal axis. Furthermore, the outer structural casing is specifically structured for being fixed to the spindle-holder carriage or slide of the numerical control machine.

More in detail, the electric motor is usually composed of a substantially cylindrical tubular shaped stator assembly which is rigidly fastened inside a specially provided cylindrical cavity in the casing of the electric spindle, so as to be coaxial to the longitudinal axis of the electric spindle; of a drive shaft that extends coaxial to the longitudinal axis of the electric spindle through the pass-through cavity of the stator assembly and the entire casing of the electric spindle; and of a substantially cylindrical tubular shaped rotor assembly which is rigidly fitted onto the drive shaft inside the stator assembly, so as to be perfectly coaxial to the latter.

The tool-holder spindle in turn is basically composed of a rotating tool-holder hub which is located at the end of the drive shaft of the electric motor, so as to protrude outside the casing of the electric spindle while remaining coaxial to the longitudinal axis of the electric spindle, and is centrally provided with a truncated-cone shank-holder seat which is structured so as to accommodate the shank of a generic tool for numerical control milling machines, while always maintaining the tool perfectly coaxial to the longitudinal axis of the electric spindle; and of a hydraulically or pneumatically operated locking member, which is structured so as to engage and retain, in a rigid and stable though easily releasable manner, the shank of the tool within the shank-holder seat of the hub, so that the drive shaft of the electric motor can drive the tool in rotation about the longitudinal axis of the electric spindle.

More in detail, the tool-holder hub is usually made in one piece with the drive shaft of the electric motor and engages, in a pass-through and axially rotatable manner, a substantially bell-shaped front cap, which is fastened to the casing of the electric spindle to close the front end of the cylindrical cavity that houses the stator assembly and the rotor assembly of the electric motor; while the drive shaft is supported in an axially rotatable manner by two sets of support rolling bearings which are located at the two axial ends of the shaft, one inside the front cap and the other abutting on the rear end of the cylindrical cavity of the electric spindle.

Although working very well, this type of electric spindle has limited operability, because the maximum rotational speed achievable by the electric spindle is closely conditioned by the structure and overall dimensions of the tool-holder spindle, which in turn are closely connected to the type of tool that the tool-holder spindle is designed to use.

Obviously, this operational constraint and the fact that the tool-holder hub is formed in one piece directly on the end of the drive shaft, compel the manufacturers of electric spindles to dimension the entire electric motor of the electric spindle so that its maximum performance is substantially equal to that permitted by the tool-holder spindle.

It is evident that these performance limits create major problems when the same numerical control milling machine must be used for mechanical machining that contemplates using, in rapid succession and on the same workpiece, two different types of tool that respectively require high driving torque and low rotational speeds (roughing tools typically require rotational speeds below 20,000 rpm), or low driving torque and high rotational speeds (finishing tools typically require rotational speeds above 20,000 rpm and usually below 50,000 rpm).

In this case, as electric spindles capable of using both types of tool cannot physically be made, when changing from a high-speed tool to a low-speed tool or vice versa, it is necessary to replace the entire electric spindle block mounted on the milling machine en masse, with all of the problems that this entails in terms of machining times and costs.

To at least partially obviate this problem, disassemblable electric spindles have been recently developed, in which the outer structural casing houses just the electric motor and is structured so as to be stably anchored to the numerical control machine. The outer casing and the electric motor housed therein are moreover structured so as to indifferently connect to two different and distinct tool-holder spindles, each of which is structured to be coupled to the electric motor, in a rigid and stable though easily releasable manner, so as to be driven in rotation by the motor with the correct rotational speed.

Even if the tool-change times of the numerical control milling machine are drastically reduced, tool-holder spindles of the disassemblable type have resulted in a significant increase on the overall length of the electric spindle and, even more important, have significantly complicated the structure of the electric spindle.

Each disassemblable tool-holder spindle, in fact, must be provided with its own hydraulically or pneumatically operated locking member that, obviously, must be adequately lubricated and, even more important, must be controllable by the numerical control machine. Requirements that impose to arrange, in the coupling zone between the electric motor and the tool-holder spindle, a considerable number of hydraulic and/or pneumatic connectors necessary for connecting the tool-holder spindle to the outer casing of the electric spindle that, in turn, is connected to the rest of the numerical control machine.

Despite the drastic reduction in weight with respect to monobloc electric spindles, even the disassemblable tool-holder spindles still have an overall weight of many tens of kilograms, with all of the drawbacks that this entails during the spindle change.

DISCLOSURE OF INVENTION

Aim of the present invention is therefore to produce an electric spindle which is capable to mount all types of tools without the above-mentioned drawbacks, and which is also cheap to manufacture.

In compliance with the above aims, according to the present invention there is provided an electric spindle as defined in claim 1 and preferably, though not necessarily, in any of its dependent claims.

BRIEF DESCRIPTION OF THE DRAWINGS

The present invention will now be described with reference to the attached drawings, which illustrate a non-limitative embodiment, where:

FIG. 3 is a sectional view of the front part of the electric spindle shown in FIG. 1 in a second working configuration; whereas

BEST MODE FOR CARRYING OUT THE INVENTION

Figure 1:
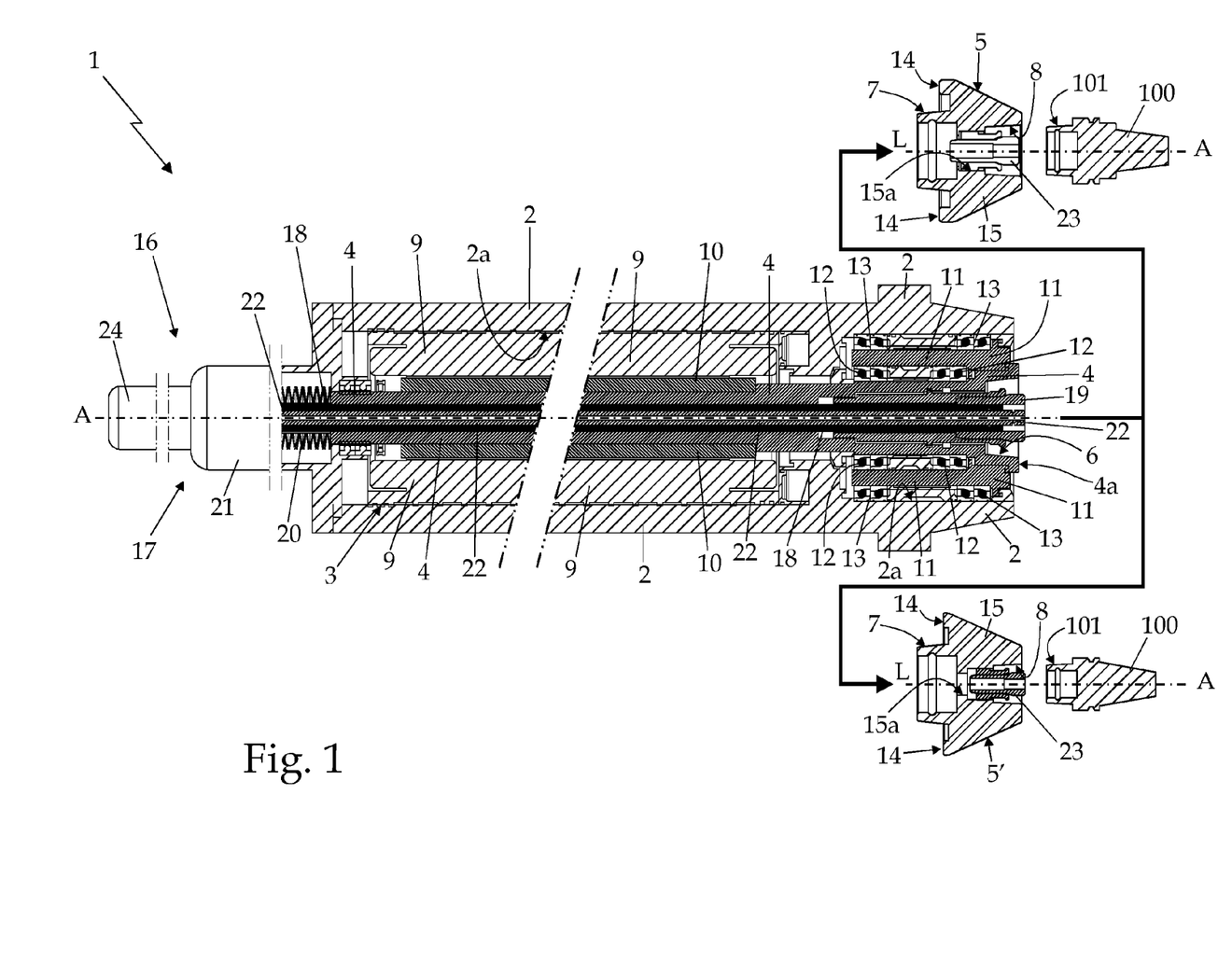
FIG. 1 is a partially exploded side view, with parts in cross-section and parts removed for clarity, of an electric spindle for numerical control machines made according to the teachings of the present invention.
Figure 2:
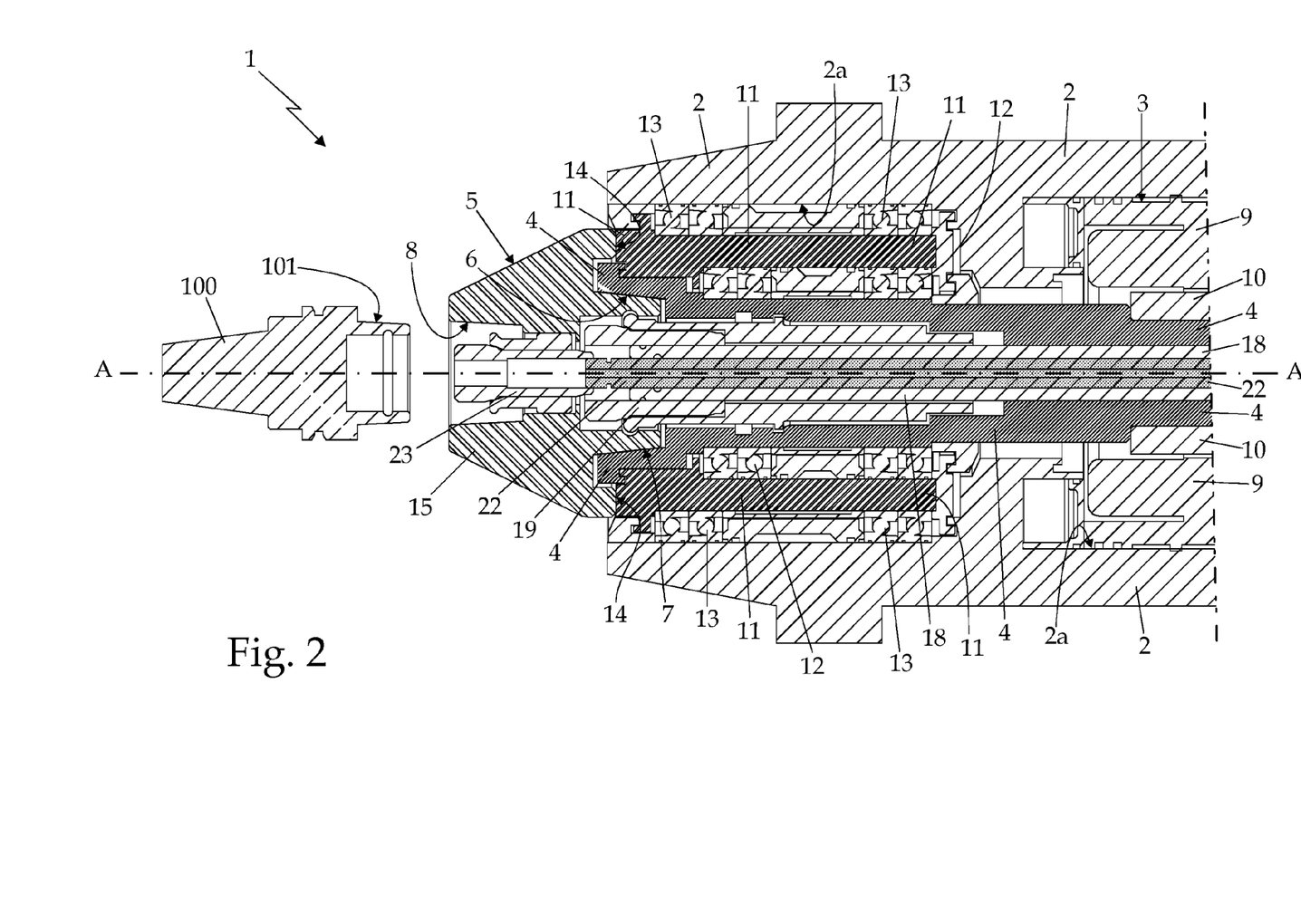
FIG. 2 is a sectional view of the front part of the electric spindle shown in FIG. 1 in a first working configuration.
Figure 3:
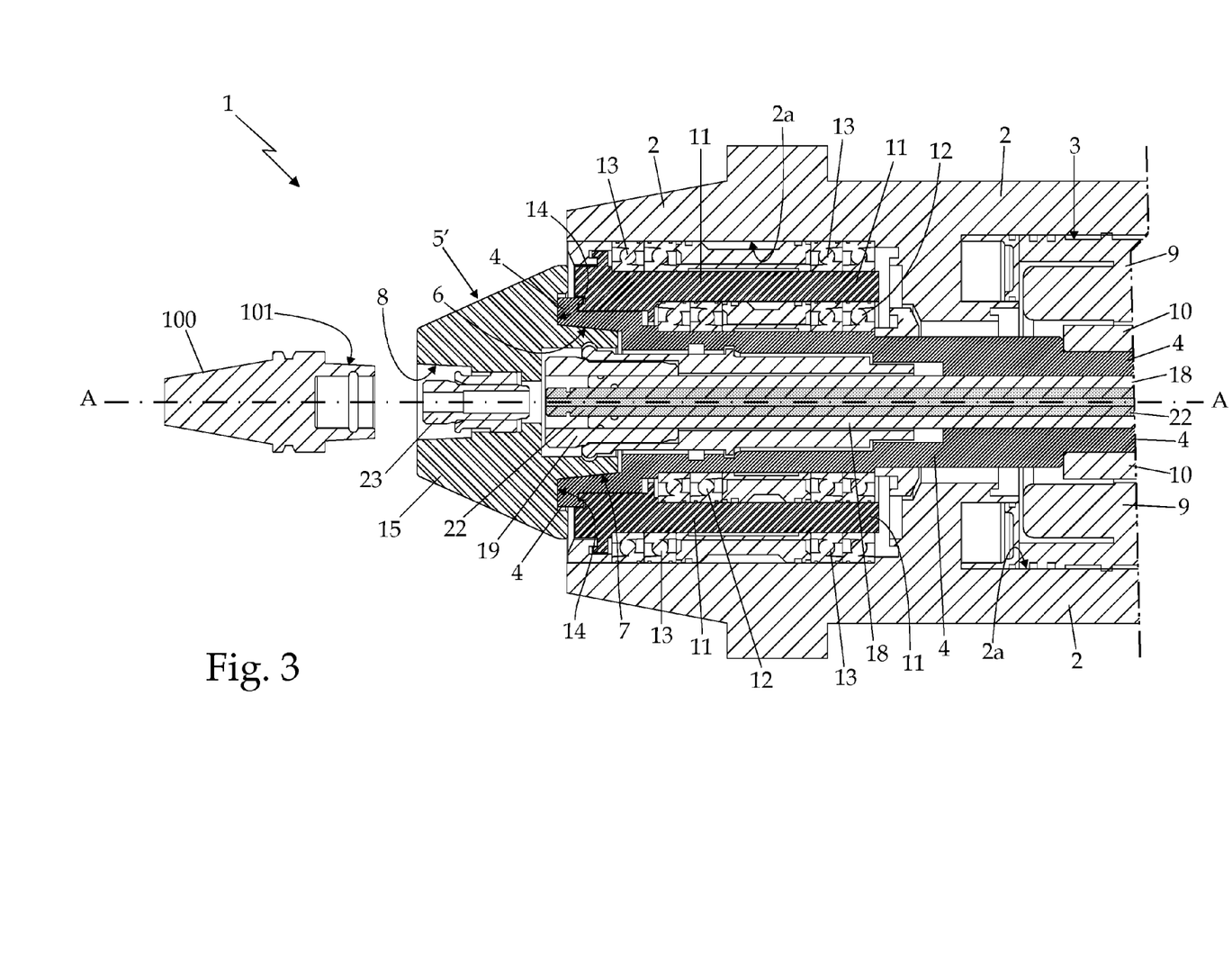

With reference to FIGS. 1, 2 and 3, reference numeral 1 indicates, as a whole, an electric spindle for numerical control machines, which has a longitudinal reference axis A and is structured to selectively lock and drive into rotation a generic tool 100 while maintaining the tool locally coaxial to the electric spindle axis A. The electric spindle 1 also finds particularly advantageous use in numerical control milling machines.

The electric spindle 1 is basically made up of an outer structural casing 2 which is structured to be rigidly attachable to the spindle holder carriage or slide (not shown) of any numerical control milling machine or similar; of an electric motor 3 which is stably housed within the structural casing 2, and is provided with a drive shaft 4 which projects/emerges with its front end 4a outside the structural casing 2 while remaining locally coaxial to the electric spindle axis A; and of at least one tool-holder head 5 which is structured to be attachable, in a rigid and stable though easily releasable manner, to the front end 4a of the drive shaft 4, and is also structured to be able to accommodate and retain, in a rigid and stable though easily releasable manner, a milling cutter 100 or other tool for numerical control machines, maintaining the above-stated tool 100 locally coaxial to the electric spindle axis A.

More in detail, with reference to FIGS. 2 and 3, the drive shaft 4 of the electric motor 3 has, at its front end 4a directly facing the outside of the structural casing 2, a preferably, though not necessarily, substantially truncated-cone shaped, shank-holder seat 6 which extends within the drive shaft 4 while remaining locally coaxial to the electric spindle axis A; and the disassemblable tool-holder head 5 is provided in the back with a preferably, though not necessarily, substantially truncated-cone shaped, locking shank 7 which is specifically structured/dimensioned to engage with and be stably engaged/locked in the shank-holder seat 6 of the drive shaft 4.

Instead, the front part of the disassemblable tool-holder head is provided with a preferably, though not necessarily, truncated-cone shaped, central shank-holder seat 8 which is locally coaxial to the locking shank 7 of the tool-holder head 5 so to be arranged perfectly coaxial to the electric spindle axis A when the tool-holder head 5 is rigidly fastened/locked onto the front end 4a of the drive shaft 4, and it is lastly specifically structured/dimensioned to accommodate and lock, in a rigid and stable though easily releasable manner, the rear shank 101 of a generic milling cutter 100 or other tool for numerical control machines, maintaining the tool 100 coaxial to the electric spindle axis A.

With reference to FIGS. 1, 2 and 3, in the example shown, in particular, the structural casing 2 is preferably consists of a rigid, internally hollow, oblong body 2 preferably, though not necessarily, with a monolithic structure, and which is provided with a preferably substantially cylindrical-shaped, oblong rectilinear cavity 2a which extends coaxial to the electric spindle axis A and communicates directly with and terminates on the outside the structural casing 2.

The electric motor 3 is thus located inside the structural casing 2, more or less on the bottom of the oblong cavity 2a, with the drive shaft 4 coaxial to the electric spindle axis A and with the front end 4a of the drive shaft 4 arranged at the entrance/mouth of the oblong cavity 2a; while the disassemblable tool-holder head 5 is suitable for being rigidly fastened/locked on the front end 4a of the drive shaft 4, at the entrance/mouth of the oblong cavity 2a.

Instead, with reference to FIG. 1, the electric motor 3 is preferably, though not necessarily, structured so as to be able to drive the drive shaft 4 in rotation about the electric spindle axis A with an angular speed adjustable/selectable at will within a range comprising the typical rotational speeds of roughing milling cutters or other tools for numerical control machines specifically structured to operate with high driving torque and low rotational speeds (the rotational speeds of roughing tools are typically between 0 and 20,000 rpm), and the typical rotational speeds of finishing milling cutters or other tools for numerical control machines specifically structured to operate with low driving torque and high rotational speeds (the rotational speeds of finishing tools are typically between 20,000 and 50,000 rpm).

In the example shown, in particular, the electric motor 3 is preferably structured so as to drive the drive shaft 4 into rotation about the electric spindle axis A with an angular speed adjustable/selectable at will within a range preferably, though not necessarily, between 0 and 50,000 rpm.

In other words, the electric motor 3 can be dimensioned from the beginning so that its maximum rotational speed coincides with the highest value of the rated speeds of all the tools 100 that can be used by the numerical control milling machine or similar (for example 50,000 rpm), and such that its maximum deliverable torque coincides with the highest value of all the maximum torques supported by all the tools 100 that can be used by the numerical control milling machine or similar.

More in detail, in the example shown, the electric motor 3 is preferably consists of a permanent-magnet rotor, three-phase electric motor or similar, which comprises a substantially cylindrical tubular shaped, stator assembly 9 which is locked inside the cavity 2a of the casing 2 so as to be coaxial to the electric spindle axis A and completely surround a section/segment of the drive shaft 4; and of a substantially cylindrical tubular shaped, rotor assembly 10 which is rigidly fitted on the drive shaft 4 inside the central cavity of the stator assembly 9, so as to be perfectly coaxial to, and completely surrounded by, the stator assembly 8.

With reference to FIGS. 1, 2 and 3, the electric spindle 1 also comprises an external rotating thrust-bearing bushing or sleeve 11, which is fitted in an axially rotatable manner on the front end 4a of the drive shaft 4, i.e. at the entrance/mouth of the oblong cavity 2a, via interposition of a first set of annular rolling bearings 12, so as to be coaxial to the electric spindle axis A and be able to rotate about axis A independently of the drive shaft 4. Furthermore, the rotating bushing or sleeve 11 is maintained coaxial to the electric spindle axis A by a second set of annular rolling bearings 13, which are interposed between the rotating bushing or sleeve 11 and the structural casing 2, and therefore have a nominal diameter greater than that of the annular rolling bearings 12 interposed between the rotating bushing or sleeve 11 and the drive shaft 4.

The annular rolling bearings 12 placed inside the rotating bushing or sleeve 11 are preferably structured/dimensioned so as to have an operating limit speed higher than the maximum rotational speed of the drive shaft 4. In particular, the inner annular rolling bearings 12 in the example shown are preferably structured/dimensioned so as to have an operating limit speed higher than 50,000 rpm.

The annular rolling bearings 13 placed outside of the rotating bushing or sleeve 11 are preferably structured/dimensioned so as to have an operating limit speed lower than the operating limit speed of the inner annular rolling bearings 12 and, if necessary, also lower than the maximum rotational speed of the drive shaft 4. In particular, the outer annular rolling bearings 13 in the example shown are preferably structured/dimensioned so as to have an operating limit speed lower than half the maximum rotational speed of the drive shaft 4, i.e. an operating limit speed preferably lower than 20,000-25,000 rpm.

As a consequence of this, the inner annular rolling bearings have a nominal diameter preferably less than 80 millimeters. Instead, the outer annular rolling bearings 13 have a nominal diameter preferably greater than 80 millimeters.

In the example shown, in particular, the inner annular rolling bearings 12 have a nominal diameter preferably equal to 50 millimeters and in any case preferably, though not necessarily, less than 60 millimeters. Instead, the outer annular rolling bearings 13 have a nominal diameter preferably equal to 100 millimeters and in any case preferably, though not necessarily, greater than 90 millimeters.

Having a relatively small diameter, the annular rolling bearings 12 can consequently be dimensioned to support low levels of radial mechanical stress and particularly high rotational speeds which are obviously higher than the maximum rotational speed of the drive shaft 4.

Having a relatively large diameter, the annular rolling bearings 13 can instead be dimensioned to support particularly high radial mechanical stress which are in any case higher than the maximum value of radial mechanical stress tolerated/transmitted by the tool-holder head 5, and low rotational speeds preferably, though not necessarily, lower than the maximum rotational speed of the drive shaft 4.

With particular reference to FIGS. 2 and 3, the disassemblable tool-holder head 5 is also provided with a peripheral circular crown 14 which is arranged coaxial to the locking shank 7 of the tool-holder head 5 so as to be arranged coaxial to the electric spindle axis A when the tool-holder head 5 is rigidly fastened/locked on the front end 4a of the drive shaft 4, and is also dimensioned/structured so as to engage, or in any case to stably abut and lock, selectively and alternatively, on the circular rim of the front end 4a of the drive shaft 4, or on the circular rim of the axial end of the rotating bushing or sleeve 11 that protrudes/faces the outside the structural casing 2.

More in detail, with reference to FIG. 2, when the shank-holder seat 8 present on the front part of the tool-holder head 5 is structured/dimensioned to accommodate the rear shank 101 of a roughing milling cutter 100 or other tool for numerical control machines specifically structured to operate with high driving torque values and low rotational speeds (for example rotational speeds preferably, though not necessarily, less than 20,000 rpm), the circular crown 14 of the tool-holder head 5 is dimensioned so as to engage, or in any case to stably abut/rest, on the circular rim of the rotating bushing or sleeve 11. In this way, the tool-holder head 5 is able to transfer/discharge the high-intensity radial stress discharged onto the tool-holder head 5, during workpiece roughing, directly onto the rotating bushing or sleeve 11, and therefore directly onto the structural casing 2 through the annular rolling bearings 13.

Instead, with reference to FIG. 3, when the shank-holder seat 8 present on the front part of the tool-holder head 5 is structured/dimensioned to accommodate the rear shank 101 of a finishing milling cutter 100 or other tool for numerical control machines specifically structured to operate with low driving torque values and high rotational speeds (for example, rotational speeds preferably, though not necessarily, higher than 20,000 rpm), the circular crown 14 of the tool-holder head 5 is dimensioned so as to engage, or in any case to stably abut/rest, on the circular rim of the front end 4a of the drive shaft 4. In this way, the tool-holder head 5 is able to transfer/discharge the low-intensity radial stress generated during workpiece finishing onto the drive shaft 4.

In other words, with reference to FIGS. 1, 2 and 3, the electric spindle 1 is preferably provided with two distinct disassemblable tool-holder heads 5 and 5', each of which is provided, on the back, with a locking shank 7 structured for being rigidly engaged/locked inside the shank-holder seat 6 on the front end 4a of the drive shaft 4.

The first disassemblable tool-holder head 5 (see FIG. 2) has the front shank-holder seat 8 structured/dimensioned to accommodate the rear shank 101 of a roughing milling cutter 100 or other tool for numerical control machines specifically structured to operate with high driving torque values and low rotational speeds, and the circular crown 14 dimensioned so as to engage, or in any case to stably abut/rest, on the circular rim of the rotating bushing or sleeve 11.

Instead, the second tool-holder head 5' (see FIG. 3) has a shank-holder seat 8 structured/dimensioned to accommodate the rear shank 101 of a finishing milling cutter 100 or other tool for numerical control machines specifically structured to operate with low driving torque values and high rotational speeds, and the circular crown 14 of the tool-holder head 5 is dimensioned so as to engage, or in any case to stably abut/rest, on the circular rim of the front end 4a of the drive shaft 4.

In the example shown, in particular, both tool-holder heads 5 and 5' are preferably, though not necessarily, formed by an approximately ogival hub 15 preferably with a monolithic structure, which has a rear tailpiece 7 shaped so as to form a shank specifically dimensioned to engage in the shank-holder seat 6 of the drive shaft 4, and is provided on the front with a shank-holder seat 8 specifically structured/dimensioned to accommodate the rear shank 101 of the tool 100.

The ogival hub 15 is also provided on the back with a peripheral circular crown or shoulder 14 that protrudes while remaining locally coaxial to the rear shank-shaped tailpiece 7, and is dimensioned so as to engage, or in any case to stably abut, selectively and alternatively, on the circular rim of the front end 4*a* of the drive shaft 4, or on the circular rim of the axial end of the rotating bushing or sleeve 11 that protrudes/faces the outside the casing 2.

The rear shank-shaped tailpiece 7, the peripheral circular shoulder 14 and the shank-holder seat 8 are obviously aligned along the axis of symmetry L of hub 15, so as to be arranged perfectly coaxial to the electric spindle axis A when the hub 15 is locked on the drive shaft 4.

Finally, the ogival hub 15 is preferably provided with a central through-hole 15*a* which is able to connect the bottom of the shank-holder seat 8 with the axial end of the rear shank-shaped tailpiece 7, and extends coaxial to the axis of symmetry L of the hub so as to be arranged perfectly coaxial to the electric spindle axis A when the hub 15 is locked on the drive shaft 4.

Finally, with reference to FIG. 1, the electric spindle 1 is equipped with a head locking and unlocking assembly 16 and with a tool locking and unlocking assembly 17, both preferably, though not necessarily, hydraulically or pneumatically operated.

The head locking and unlocking assembly 16 is structured so as to selectively couple and lock/retain, in a rigid and stable though easily releasable manner, the locking shank 7 of the tool-holder head 5 inside the shank-holder seat 6 on the front end 4*a* of the drive shaft 4, so as to allow the drive shaft 4 to drive the tool-holder head 5 in rotation about the electric spindle axis A.

Instead, the tool locking and unlocking assembly 17 is structured so as to selectively couple and lock/retain, in a rigid and stable though easily releasable manner, the rear shank 101 of the milling cutter 100 or other tool for numerical control machines, inside the shank-holder seat 6 present on the tool-holder head 5, so as to allow the tool-holder head 5 to drive the tool 100 in rotation about the electric spindle axis A.

With reference to FIGS. 1, 2 and 3, in the example shown, in particular, the head locking and unlocking assembly 16 preferably comprises: a command rod 18 which extends in a pass-through and axially sliding manner through the entire drive shaft 4 while remaining coaxial to the electric spindle axis A, so as to protrude within the shank-holder seat 6 present on the front end 4*a* of the drive shaft 4; and an expansion coupling head 19 which is slidingly fitted on the end of the command rod 18 protruding within the shank-holder seat 6 of the drive shaft 4, and is structured so as to be able to open in an umbrella-like manner inside a cavity specifically made at the centre of the rear locking shank 7 of the tool-holder head 5, 5', under the thrust of command rod 18.

More in detail, the command rod 18 is axially movable inside the drive shaft 4 between a retracted position wherein the rod 18 arranges the coupling head 19 against the bottom of the shank-holder seat 6 and simultaneously forces the coupling head 19 to open in an umbrella-like manner; and an extracted position wherein the command rod 18 moves the coupling head 19 away from the bottom of the shank-holder seat 6, allowing the coupling head 19 to close in an umbrella-like manner.

Finally, the head locking and unlocking assembly 16 comprises an elastic member 20 which is interposed between the command rod 18 and the structural casing 2 and is structured so as to exert axial thrust on the rod 18 that tends to continuatively maintain the command rod 18 in the retracted position; and a push member 21 which, when operated, is able to push the command rod 18 from the retracted position to the extracted position, overcoming the elastic force of the elastic member 20, so as to move the coupling head 19 away from the bottom of the shank-holder seat 6 and simultaneously allow the coupling head 19 to close in an umbrella-like manner, freeing the locking shank 7 of the tool-holder head 5 that is currently locked on the front end 4*a* of the drive shaft 4.

In particular, the elastic member 20 in the example shown is preferably composed of a stack of Belleville springs 20 or similar which are fitted on the command rod 18, or directly on the drive shaft 4, and are interposed between the command rod 18 and the structural casing 2 so as to exert an axial thrust on the rod 18 that tends to continuatively maintain the command rod 18 in the retracted position. Instead, the push member 21 preferably consists of a single or double-acting hydraulic or pneumatic piston 21 which is housed within the casing 2, aligned with the drive shaft 4 of the electric motor 3, obviously on the opposite end with respect to the front end 4*a* of the drive shaft 4, and is mechanically connected to the command rod 18 so that it can axially move the latter inside the drive shaft 4.

With reference to FIGS. 1, 2 and 3, similarly to the head locking and unlocking assembly 16, in the example shown also the tool locking and unlocking assembly 17 preferably comprises: a command rod 22 which extends in a pass-through and axially sliding manner through the entire command rod 18 while remaining coaxial to the electric spindle axis A, so as to protrude from the shank-holder seat 6 on the front end 4*a* of the drive shaft 4, to engage in a pass-through and axially sliding manner the tool-holder head 5, 5' currently locked on the front end 4*a* of the drive shaft 4 and finally protrude inside the shank-holder seat 8 present on the front part of the tool-holder head 5, 5'; and an expansion coupling head 23 which is slidingly fitted on the end of the command rod 22 protruding within the shank-holder seat of the tool-holder head 5, 5', and is structured so as to be able to open in an umbrella-like manner inside a cavity specifically made at centre of the shank 101 of the tool 100, under the thrust of the command rod 22.

Thus, in this case as well, the command rod 22 is axially movable within the command rod 18 between a retracted position, wherein the rod 22 arranges the coupling head 23 against the bottom of the shank-holder seat 8, and simultaneously forces the coupling head 23 to open in an umbrella-like manner; and an extracted position, wherein the command rod 22 moves the coupling head 23 away from the bottom of the shank-holder seat 8, allowing the coupling head 23 to close in an umbrella-like manner.

Finally, the tool locking and unlocking assembly 17 comprises an elastic member (not shown) which is interposed between the command rod 22 and the structural casing 2 and is structured so as to exert an axial thrust on the rod 22 that tends to continuatively maintain the command rod 22 in the retracted position; and a push member 24 which, when operated, is able to push the command rod 22 from the retracted position to the extracted position, overcoming the elastic force of the associated elastic member, so as to move the coupling head 23 away from the bottom of the shank-holder seat 8 and simultaneously allow the coupling head 23 to close in an umbrella-like manner, freeing the shank 101 of the tool 100 that is currently locked on the tool-holder head 5, 5' integral with the drive shaft 4.

In the example shown, in particular, the elastic member (not shown) of the tool locking and unlocking assembly 17 preferably consists of a stack of Belleville springs (not shown) or similar which are fitted on the command rod 22, or directly on the command rod 18, and are interposed between the command rod 22 and the structural casing 2 so as to exert an axial thrust on the rod 22 that tends to continuatively maintain the command rod 22 in the retracted position. Instead, the push member 24 preferably consists of a single or double-acting hydraulic or pneumatic piston 24 which is housed within the casing 2, aligned with the drive shaft 4 of the electric motor 3, obviously on the opposite end with respect to the front end 4a of the drive shaft 4, and is mechanically connected to the command rod 22 so to be able to axially move the latter inside command rod 18 which, in turn, is slidingly inserted inside the drive shaft 4.

Figure 4:
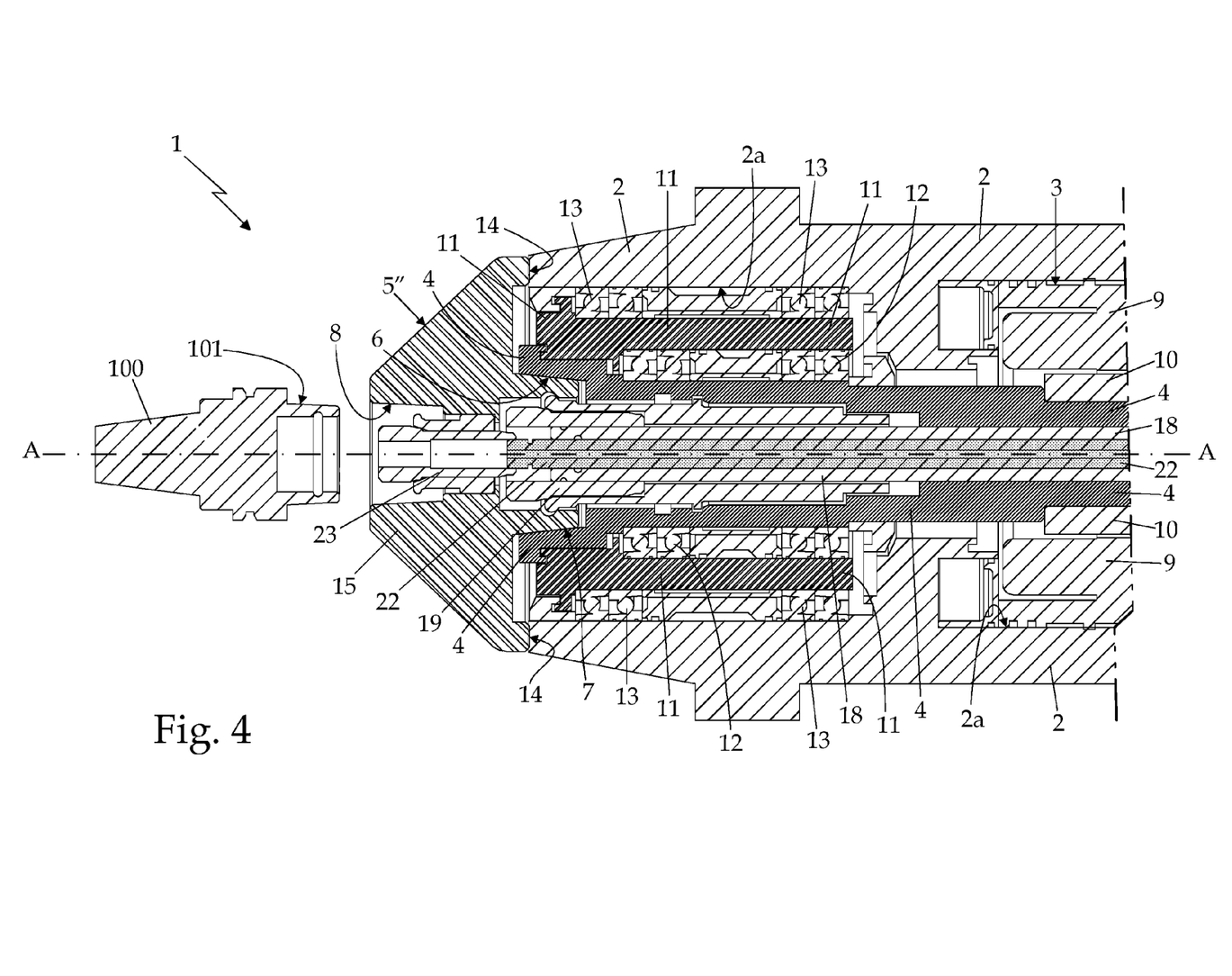
FIG. 4 is a sectional view of the front part of the electric spindle shown in FIG. 1 in an optional third working configuration.

Finally, with reference to FIG. 4, the electric spindle 1 can optionally also comprise a third disassemblable tool-holder head 5", which is provided with a rear locking shank 7 specifically structured/dimensioned to be stably engaged and locked in the shank-holder seat 6 of the drive shaft 4, and a circular crown 14 specifically dimensioned so as to engage, or in any case to stably abut/rest, on the circular rim of the structural casing 2 that delimits the entrance/mouth of the oblong cavity 2a, so as to rigidly lock the tool-holder head 5" directly on the structural casing 2, i.e. to prevent any rotation of the tool-holder head 5" about the electric spindle axis A.

Operation of the electric spindle 1 is easily inferable from the foregoing description and does not require further explanations.

The advantages deriving from the particular structure of the electric spindle 1 are remarkable and numerous.

The passage from the configuration for low-speed tools to the configuration for high-speed tools requires the simple substitution of the disassemblable tool-holder head 5, 5', 5". An operation that is extremely simple and rapid as the tool-holder head 5, 5', 5", or rather the ogival hub 15, has significantly less weight and overall dimensions than those of normal tool-holder spindles of the disassemblable type.

In fact, electric motor 3, rotating bushing or sleeve 11, head locking and unlocking assembly 16 and the tool locking and unlocking assembly 17 remain always fixed to the structural casing 2 which is anchored to and supported by the spindle holder slide or carriage of the numerical control milling machine or similar.

Furthermore, the structure of the disassemblable tool-holder head 5, 5', 5" is extremely simple and inexpensive to manufacture, with all the advantages that this entails.

Moreover, the particular structure of electric spindle 1 allows to use, as electric motor 3, the most recent, electronically controlled, electric "torque" motors with an angular speed variable at will between 0 and 50,000 rpm.

Last, but not least, the electric spindle 1 also lends itself to being mounted in numerical control machines already on the market: in fact, it is sufficient to make the casing 2 of the electric motor so that it follows the form of the casing of the traditional electric spindles.

Finally, it is clear that modifications and variants can be made to the above-described electric spindle 1 without however departing from the scope of the present invention.

For example, in a different embodiment, instead of being formed by a stack of Belleville springs, the elastic member 20 of the head locking and unlocking assembly 16 and/or the elastic member of the tool locking and unlocking assembly 17 could be formed by gas springs, sleeves made of an elastomeric material or other types of elastic devices.

The invention claimed is:

1. An electric spindle (1) for numerical control machines structured to lock and drive into rotation a tool (100) about a predetermined reference axis (A) locally coinciding with the longitudinal axis of the tool (2); the electric spindle (1) comprising an outer structural casing (2) which is structured to be rigidly attachable to a generic numerical control machine, and an electric motor (3) which is housed within the structural casing (2) and is provided with a drive shaft (4), which projects/emerges with its front end (4a) outside the structural casing (2) while remaining locally coaxial to the reference axis (A) of the electric spindle;

the electric spindle (1) being characterized by also comprising:
a thrust-bearing rotating bushing or sleeve (11) which is fitted in an axially rotatable manner on the front end (4a) of the drive shaft (4) via interposition of a first set of annular rolling bearings (12), and is maintained coaxial to the electric spindle reference axis (A) by a second set of annular rolling bearings (13) which are interposed between the rotating bushing or sleeve (11) and the structural casing (2); and
a first disassemblable tool-holder head (5) which is structured to be fixable in a rigid and stable, though easily releasable manner to the front end (4a) of the drive shaft (4), is structured so as to accommodate and retain in a rigid and stable though easily releasable manner the shank (101) of a generic tool (100) for numerical control machines, and is provided with a peripheral crown (14) adapted to stably abut and engage onto the rotating thrust-bearing bushing or sleeve (11); and
an alternative, second disassemblable tool-holder head (5') which is structured to be fixable in a rigid and stable though easily releasable manner to the front end (4a) of the drive shaft (4), is structured so as to accommodate and retain in a rigid and stable though easily releasable manner the shank (101) of a generic tool (100) for numerical control machines, and is finally provided with a peripheral crown (14) adapted to stably abut and engage onto the front end (4a) of the drive shaft (4).

2. Electric spindle according to claim 1, characterized in that the front end (4a) of the drive shaft (4) is provided with a first shank-holder seat (6) locally coaxial to the reference axis (A) of the electric spindle; and in that the disassemblable tool-holder head (5, 5') is provided in the back with a locking shank (7) which is specifically structured/dimensioned to be engaged and locked in the shank-holder seat (6) of the drive shaft (4).

3. Electric spindle according to claim 1, characterized in that the front part of the disassemblable tool-holder head (5, 5') is provided with a second shank-holder seat (8) which is coaxial to the locking shank (7) of the disassemblable tool-holder head (5, 5') and is structured/dimensioned to accommodate and lock in a rigid and stable, though easily releasable manner, the shank (101) of said tool (100) for numerical control machines.

4. Electric spindle according to claim 3, characterized by comprising a first disassemblable tool-holder head (5) which is provided in the back with a locking shank (7) structured/dimensioned to engage and lock in the shank-holder seat (6) of the drive shaft (4), which has a front shank-holder seat (8) structured/dimensioned to accommodate the shank (101) of a tool (100) for numerical control machines specifically structured to operate with high driving torque values and low rotational speeds, and which finally has a peripheral crown (14) dimensioned so as to engage or stably abut/rest on the rotating thrust-bearing bushing or sleeve (11).

5. Electric spindle according to claim 3, characterized by comprising a second disassemblable tool-holder head (5') which is provided in the back with a locking shank (7) structured/dimensioned to engage and lock in the shank-holder seat (6) of the drive shaft (4), which has a front shank-holder seat (8) structured/dimensioned to accommodate the shank (101) of a tool (100) for numerical control machines specifically structured to operate with low driving torque values and high rotational speeds, and which has a peripheral crown (14) dimensioned so as to engage or stably abut/rest on the front end (4a) of the drive shaft (4).

6. Electric spindle according to claim 1, characterized in that the disassemblable tool-holder head (5, 5') is formed by an approximately ogival hub (15), which has a rear tailpiece (7) shaped so as to form a shank specifically dimensioned to engage in the shank-holder seat (6) of the drive shaft (4), and is provided on the front with a shank-holder seat (8) specifically structured/dimensioned to accommodate the rear shank (101) of the tool (100) for numerical control machines; said hub (15) being also provided with a peripheral circular crown or shoulder (14) which protrudes while remaining locally coaxial to the rear shank-shaped tailpiece (7), and is dimensioned so as to engage or stably abut, selectively and alternatively, on the front end (4a) of the drive shaft (4), or on the rotating thrust-bearing bushing or sleeve (11).

7. Electric spindle according to claim 6, characterized in that said approximately ogival hub (15) is provided with a central through-hole (15a) which connects the bottom of the shank-holder seat (8) of the hub with the end of the rear shank-shaped tailpiece (7) of the hub, and extends coaxial to the axis of symmetry of the hub (L) so as to be arranged coaxial to the reference axis (A) of the electric spindle when the hub (15) is locked on the drive shaft (4).

8. Electric spindle according to claim 6, characterized in that said approximately ogival hub (15) has a monolithic structure.

9. Electric spindle according to claim 1, characterized by also comprising a head locking and unlocking assembly (16) which is structured to selectively couple and lock/retain, in a rigid and stable though easily releasable manner, the disassemblable tool-holder head (5, 5') on the front end (4a) of the drive shaft (4), so as to allow the drive shaft (4) to drive the tool-holder head (5) in rotation about the reference axis (A) of the electric spindle.

10. Electric spindle according to claim 9, characterized in that the head locking and unlocking assembly (16) comprises: a first command rod (18) which extends in a pass-through and axially sliding manner through the drive shaft (4) while remaining coaxial to the reference axis (A) of the electric spindle, so as to protrude within the shank-holder seat (6) present on the front end (4a) of the drive shaft (4); and a first expansion coupling head (19) which is slidingly fitted on the end of the first command rod (18) protruding within the shank-holder seat (6) of the drive shaft (4), and is structured so as to be able to open in umbrella-manner within a cavity specifically realized at centre of the rear locking shank (7) of the tool-holder head (5, 5'), under the thrust of the first command rod (18).

11. An electric spindle (1) for numerical control machines structured to lock and drive into rotation a tool (100) about a predetermined reference axis (A) locally coinciding with the longitudinal axis of the tool (2); the electric spindle (1) comprising an outer structural casing (2) which is structured to be rigidly attachable to a generic numerical control machine, and an electric motor (3) which is housed within the structural casing (2) and is provided with a drive shaft (4), which projects/emerges with its front end (4a) outside the structural casing (2) while remaining locally coaxial to the reference axis (A) of the electric spindle;
the electric spindle (1) being characterized by also comprising:
a thrust-bearing rotating bushing or sleeve (11) which is fitted in an axially rotatable manner on the front end (4a) of the drive shaft (4) via interposition of a first set of annular rolling bearings (12), and is maintained coaxial to the electric spindle reference axis (A) by a second set of annular rolling bearings (13) which are interposed between the rotating bushing or sleeve (11) and the structural casing (2);
at least one disassemblable tool-holder head (5, 5') which is structured to be fixable in a rigid and stable, though easily releasable manner to the front end (4a) of the drive shaft (4), is structured so as to accommodate and retain in a rigid and stable though easily releasable manner the shank (101) of a generic tool (100) for numerical control machines, and is finally provided with a peripheral crown (14) which is dimensioned/structured to stably abut, selectively and alternatively, on the front end (4a) of the drive shaft (4) or on the rotating thrust-bearing bushing or sleeve (11); and
the electric spindle characterized by also comprising a tool locking and unlocking assembly (17) which is structured to selectively couple and lock/retain, in a rigid and stable though easily releasable manner, the shank (101) of the tool (100) for numerical control machines, so as to allow the disassemblable tool-holder head (5, 5') to drive the tool (100) in rotation about the reference axis (A) of the electric spindle.

12. Electric spindle according to claim 11, characterized by also comprising a head locking and unlocking assembly (16) which is structured to selectively couple and lock/retain, in a rigid and stable though easily releasable manner, the disassemblable tool-holder head (5, 5') on the front end (4a) of the drive shaft (4), so as to allow the drive shaft (4) to drive the tool-holder head (5) in rotation about the reference axis (A) of the electric spindle.

13. Electric spindle according to claim 12, characterized in that the head locking and unlocking assembly (16) comprises: a first command rod (18) which extends in a pass-through and axially sliding manner through the drive shaft (4) while remaining coaxial to the reference axis (A) of the electric spindle, so as to protrude within the shank-holder seat (6) present on the front end (4a) of the drive shaft (4); and a first expansion coupling head (19) which is slidingly fitted on the end of the first command rod (18) protruding within the shank-holder seat (6) of the drive shaft (4), and is structured so as to be able to open in umbrella-manner within a cavity specifically realized at centre of the rear locking shank (7) of the tool-holder head (5, 5'), under the thrust of the first command rod (18).

14. Electric spindle according to claim 13, characterized in that the tool locking and unlocking assembly (17) comprises: a second command rod (22) which extends in a pass-through and axially sliding manner through the first command rod (18) while remaining coaxial to the reference axis (A) of the electric spindle, so as to protrude from the shank-holder seat (6) on the front end (4a) of the drive shaft (4), to engage in a pass-through and axially sliding manner the disassemblable tool-holder head (5, 5') currently locked on the front end (4a) of the drive shaft (4), and finally to protrude within the shank-holder seat (8) present on the front part of the tool-holder head (5, 5'); and a second expansion coupling head (23) which is slidingly fitted on the end of the second command rod (22) that protrudes within the shank-holder seat (8) on the disassemblable tool-holder head (5, 5'), and is structured so as to be able to open in umbrella-manner within a cavity specifically made at centre of the shank (101) of the tool (100) for numerical control machines, under the thrust of the second command rod (22).

15. Electric spindle according to claim 1, characterized in that the first set of annular rolling bearings (12) is structured/dimensioned so as to have an operating limit speed higher than the maximum rotational speed of the drive shaft (4).

16. Electric spindle according to claim 1, characterized in that the second set of annular rolling bearings (13) is structured/dimensioned so as to have an operating limit speed lower than the maximum rotational speed of the drive shaft (4).

17. Electric spindle according to claim 1, characterized in that the electric motor (3) is structured so as to be able to drive into rotation the drive shaft (4) about the reference axis (A) of the electric spindle with an angular speed adjustable/selectable in a range which comprises the typical rotational speeds of roughing cutters or other tools for numerical control machines specifically structured to operate with high driving torque values and low rotational speeds, and the typical rotational speeds of finishing cutters or other tools for numerical control machines specifically structured to operate with low driving torque values and high rotational speeds.

18. Electric spindle according to claim 1, characterized in that the electric motor (3) is structured/dimensioned so as to be able to drive in rotation the drive shaft (4) about the reference axis (A) of the electric spindle with an angular speed adjustable/selectable in a range between 0 and 50,000 rpm.

\* \* \* \* \*